United States Patent [19]

Redman et al.

[11] 4,258,738

[45] Mar. 31, 1981

[54] CRASHWORTHY FUEL SYSTEM

[75] Inventors: David T. Redman; George J. Paulis, both of Trumbull, Conn.

[73] Assignee: The United States of America as represented by the Secretary of the Army, Washington, D.C.

[21] Appl. No.: 28,040

[22] Filed: Apr. 9, 1979

[51] Int. Cl.³ .............................................. F16K 13/04
[52] U.S. Cl. ..................................... 137/68; 251/144; 220/DIG. 6; 137/899.2
[58] Field of Search ..................... 239/110; 137/68–71, 137/899.2; 251/144; 220/1 C, DIG. 6

[56] References Cited

U.S. PATENT DOCUMENTS

| 1,373,324 | 3/1921 | Gomez | 239/110 |
| 3,665,946 | 5/1972 | Robinson | 137/68 R |

Primary Examiner—Harold W. Weakley
Attorney, Agent, or Firm—Nathan Edelberg; Robert P. Gibson; Norman L. Wilson, Jr.

[57] ABSTRACT

A crashworthy fuel system for aircraft or the like comprising a fuel tank and a valve for securement to the bottom of the tank. The valve comprises a generally L-shaped body having a first leg and a second leg extending generally at right angles to the first leg. A main flow passage extends through the entire length of the body. The first leg has a peripheral flange spaced from its outer end which is secured in face-to-face relation to the bottom of the tank with the outer end of the first leg extending up through a hole in the bottom of the tank into the interior of the tank for flow of fuel into the main flow passage and the second leg extending below the tank on the outside thereof for connection at its outer end to a fuel delivery line. The first leg has a circumferential area of weakness adjacent the flange between the flange and the second leg. A valve is provided in the main flow passage between this area of weakness and the inlet end of the main flow passage for sealing the main flow passage in the event of rupture of the valve body at the area of weakness, as during a crash of the aircraft. A valve is also provided toward the outlet end of the main flow passage for draining the latter.

6 Claims, 3 Drawing Figures

CRASHWORTHY FUEL SYSTEM

BACKGROUND OF THE INVENTION

This invention relates to a crashworthy fuel system for aircraft, for example, and more particularly to a valve used in such a system for delivery of fuel from a fuel tank to an engine of the aircraft.

Inasmuch as water has a specific gravity which is greater than common aircraft fuels (e.g., kerosene), any water in solution with fuel in an aircraft fuel tank tends to settle to the lowest point in the tank. In many types of aircraft, this point is a sump projecting down below the bottom of the tank, the sump being equipped with means for draining any water collecting in the sump. However, this arrangement has proven to be undesirable in that the sump is prone to rupture during a forced or crash landing of the aircraft, resulting in spillage of fuel from the tank.

SUMMARY OF THE INVENTION

Among the several objects of this invention may be noted the provision of a crashworthy fuel system for aircraft or the like; the provision of such a system which is designed to prevent spillage of fuel from a fuel tank of the aircraft during a crash or forced landing of the aircraft; the provision of an improved valve used in such system for delivery of fuel from the tank to an engine of the aircraft; the provision of such a valve from which water may quickly and easily be drained for preventing freezing of water within the valve, as well as corrosion of the tank and valve; and the provision of such a valve which is designed for economical production.

Generally, a crashworthy fuel system of this invention for aircraft or the like comprises a fuel tank and a valve adapted to be secured to the bottom of the tank. The valve comprises a generally L-shaped body having a first leg, and a second leg extending generally at right angles to the first leg, and a main flow passage through the body constituted by a bore extending the entire length of the body, one end of the bore at the outer end of the first leg constituting an inlet end and the other end of the bore at the outer end of the second leg constituting an outlet end. The first leg has a peripheral flange spaced from its outer end adapted to be secured in face-to-face relation to the bottom of the tank with the outer end of the first leg extending up through a hole in the bottom of the tank into the interior of the tank for flow of fuel into the inlet end of the main flow passage, and the second leg extending below the tank on the outside thereof for connection of the outlet end of the main flow passage to a fuel delivery line. The first leg has a circumferential area of weakness adjacent the flange between the flange and the second leg. Means are provided in the main flow passage between this area of weakness and the inlet end of the main flow passage for sealing the main flow passage in the event of rupture of the valve body at the area of weakness, as during a crash of the aircraft. Means are also provided toward the outlet end of the main flow passage for draining the latter. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
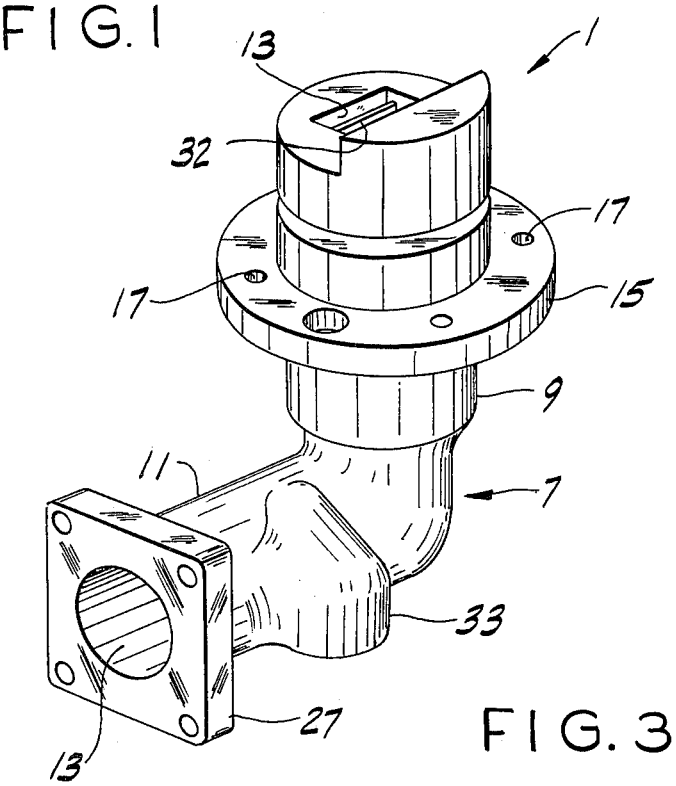
FIG. 1 is a perspective of a valve of this invention attached to the bottom of a fuel tank.
Figure 2:
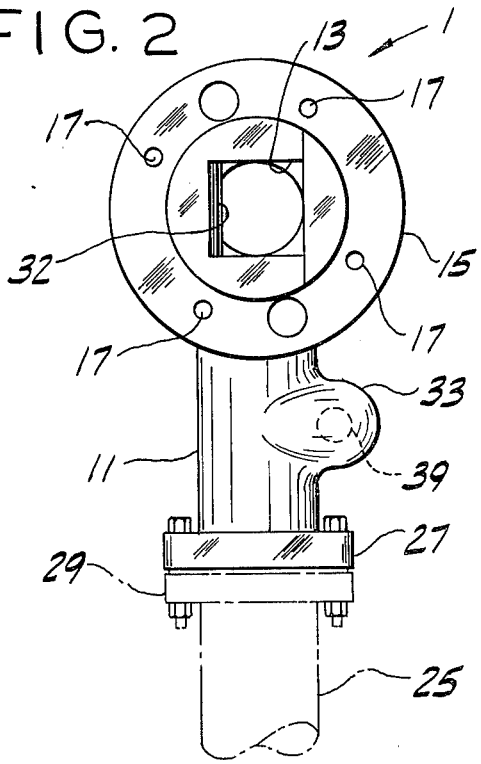
FIG. 2 is a plan of the valve of FIG. 1.

Referring now to the drawings, an improved valve of a crashworthy fuel system of this invention is designated in its entirety by the reference numeral 1 and is shown attached to an access panel 3 at the bottom of a fuel tank 5 which may, for example, be an aircraft fuel tank. This valve 1 comprises a generally L-shaped valve body, indicated generally at 7, having a first leg 9 and a second leg 11 extending generally at right angles to the first leg. A main flow passage constituted by a bore 13 extends the entire length of the body through both legs 9, 11, one end of the bore at the outer end of the first leg 9 constituting an inlet end of the main flow passage and the other end of the bore at the outer end of the second leg 11 constituting an outlet end of the main flow passage. For reasons which will become apparent hereinafter, the portion of the bore toward the outer end of the first leg is generally square in section while the remainder is circular in section. The transition line between the square and circular portion of the bore is designated 14.

Spaced below the outer end of leg 9 and indicated at 15 is a peripheral flange of circular shape having a plurality of holes 17 herein for receiving bolts 18 or other suitable fasteners to secure the valve to the underside of the access panel 3 of fuel tank 5. As shown in the drawings, the flange is secured in face-to-face relation to the bottom of the panel with leg 9 extending generally vertically up through a hole 19 in the tank and leg 11 extending generally horizontally below the tank on the outside of the tank. A gasket 21 between the upper face of the flange 15 and the bottom of the access panel 3 seals the valve to the panel.

Figure 3:
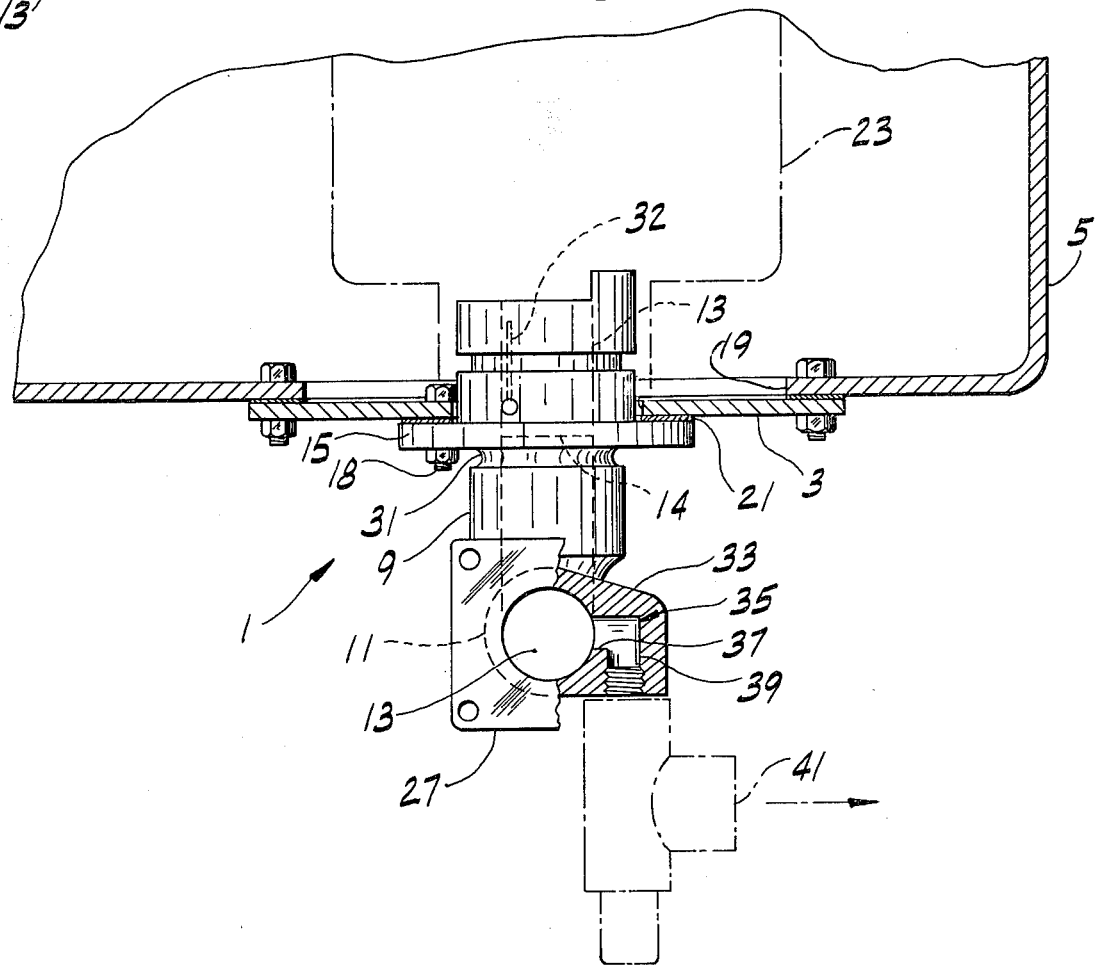
FIG. 3 is a section of the valve of FIG. 1 taken through its second leg.

The upper end of leg 9 (i.e., the portion projecting up into the interior of the tank) is formed for connection to the discharge of a pump 23, shown in phantom in FIG. 3, which pumps fuel from within the tank through the main flow passage 13 in the valve 1 and into a fuel delivery line 25 (also shown in phantom) attached to leg 11 for delivery to an engine of the aircraft. In this regard, leg 11 of valve 1 has a square flange 27 at its outer end for connection to a coupling 29 of fuel line 25.

As indicated at 31, the portion of the vertical leg 9 immediately below flange 15 is of reduced diameter, thus providing a circumferential area of weakness around the leg which is desirable for reasons which will appear hereinafter. Located above this reduced-diameter portion 31 in the main flow passage 13 is a self-sealing mechanism comprising a flapper valve 32. This valve, which is pivotally mounted in the square-bore portion of the main flow passage for swinging between open and closed positions, is normally held in an open position permitting flow of fuel through the main flow passage in the valve. In the event the fuel tank 5 tears away from its supports and slides along the fuselage of the aircraft, as during a forced or crash landing, the portion of the valve below flange 15 is designed to break away at the reduced-diameter portion 31 and the flapper valve, which is spring-biased to close when valve body 7 breaks away, to snap shut to seal the main flow passage and prevent leakage of fuel from the tank.

In accordance with this invention, a boss 33, which is preferably integrally formed (e.g., cast) with the valve body 7, projects laterally from the right (as viewed in the drawings) side of the horizontal leg 11 of the valve and has a drain passage 35 therein communicating with the main flow passage 13 in the valve. This drain passage is constituted by a bore having a horizontal bore portion 37 extending generally horizontally in the boss from the main flow passage 13, the longitudinal center line of this bore portion being generally at the same level as the longitudinal center line of the main flow passage 13 through leg 11, and a vertical bore portion 39 extending down from the horizontal bore portion 37. The lower end of bore portion 39 is internally threaded for receiving a drain valve or cock 41, shown in phantom, which is manually moveable between an open position in which flow from the main flow passage 13 through drain passage 35 is permitted for draining the valve, and a closed position in which such flow is blocked.

In order to periodically drain water from the valve that has settled out of solution with the fuel in the tank, the drain valve 41 is moved to its open position and the water allowed to drain from the main flow passage 13 in the valve via drain passage 35. The drain valve 41 is then closed for flow of fuel from the tank through the main flow passage and into fuel line 25 for delivery to an engine of the aircraft. Draining of water from the valve 1, the lowest point in the fuel system, is important in that if water were allowed to collect in the main flow passage 13, it could freeze at low temperatures and block the flow of fuel through the valve. Moreover, freezing of the water could also prevent the proper functioning of the self-sealing mechanism in the valve in the event of a crash or the like. Periodic draining of the water from the valve and tank also reduces corrosion.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a crashworthy fuel system for aircraft, a fuel tank, a valve therefor comprising a generally L-shaped body, a bore extending the entire length of the L-shaped body forming a main flow passage through the valve, one body portion being a first leg having a fuel inlet, the other body portion being a second leg extending generally at right angles to the first leg and having a fuel outlet, means adapted to secure the valve to the bottom of the fuel tank with the first leg generally vertical, with the inlet extending into the interior of the tank for flow of fuel into the main valve passage, and with the second leg generally horizontal and below the tank on the outside thereof, means including the length of the first leg, an upwardly inclined fuel line, and its connectors making the second leg the lowest point in the fuel system and hence a sump for water accumulation, a boss projecting laterally from said second (sump) leg, means in said boss for draining water from said second (sump) leg, a circumferential area of weakness around the first leg between the fuel tank and the second leg, a normally open valve closure mechanism in the main flow passage between the inlet end of the main flow passage and the area of weakness, and means closing said mechanism in the event of rupture of the L-shaped valve at said area of weakness to seal the main flow passage.

2. A crashworthy fuel system as set forth in claim 1 wherein said drain means comprises a boss projecting laterally from the second leg having a drain passage therein constituted by a bore extending through the boss and communicating at one end with the main flow passage in the body, said drain passage being adapted to receive valve means therein movable between an open position in which flow from the main flow passage is blocked and an open position in which flow from the main flow passage is permitted for draining the latter.

3. A valve as set forth in claim 2 wherein the other end of said drain passage is formed for threadably receiving said valve means.

4. A valve as set forth in claim 2 wherein the drain passage comprises a horizontal portion extending generally horizontally in the boss from the main flow passage and a vertical portion extending down from the horizontal portion through the boss.

5. A valve as set forth in claim 4 wherein the longitudinal center line of the horizontal portion of the drain passage is generally at the same level as the longitudinal center line of the main flow passage through the second leg.

6. A valve as set forth in claim 2 wherein said boss is integrally formed with the second leg of the valve body.

* * * * *